(12) United States Patent
Rancruel et al.

(10) Patent No.: US 9,739,478 B2
(45) Date of Patent: *Aug. 22, 2017

(54) SYSTEM AND METHOD FOR HEAT RECOVERY STEAM GENERATORS

(71) Applicant: General Electric Company, Schenectady, NY (US)

(72) Inventors: Diego Fernando Rancruel, Greenville, SC (US); Drake Joseph Viscome, Greenville, SC (US); Elizabeth Angelyn Fadde, Greenville, SC (US); Ashlee Nicole Atwell, Simpsonville, SC (US); Kyle Joseph Conger, Greenville, SC (US)

(73) Assignee: General Electric Company, Schenectady, NY (US)

( * ) Notice: Subject to any disclaimer, the term of this patent is extended or adjusted under 35 U.S.C. 154(b) by 553 days.

This patent is subject to a terminal disclaimer.

(21) Appl. No.: 13/759,985

(22) Filed: Feb. 5, 2013

(65) Prior Publication Data
US 2014/0216363 A1   Aug. 7, 2014

(51) Int. Cl.
| | |
|---|---|
| F22G 3/00 | (2006.01) |
| F22B 29/06 | (2006.01) |
| F22B 33/02 | (2006.01) |
| F22G 5/00 | (2006.01) |
| F01K 23/06 | (2006.01) |
| F01K 23/10 | (2006.01) |

(52) U.S. Cl.
CPC ............. *F22G 3/00* (2013.01); *F01K 23/067* (2013.01); *F01K 23/10* (2013.01); *F22B 29/06* (2013.01); *F22B 33/02* (2013.01); *F22G 5/00* (2013.01); *Y02E 20/16* (2013.01); *Y02E 20/18* (2013.01); *Y10T 137/0324* (2015.04)

(58) Field of Classification Search
USPC .................................. 122/406.4, 476, 479.7
See application file for complete search history.

(56) References Cited

U.S. PATENT DOCUMENTS

| | | | | |
|---|---|---|---|---|
| 1,877,640 | A * | 9/1932 | Baumann | F22B 1/14 122/1 R |
| 3,175,367 | A * | 3/1965 | Gorzegno et al. | 60/646 |
| 3,769,795 | A | 11/1973 | Rostrom | |
| 3,769,941 | A * | 11/1973 | Dolezal | F22B 29/04 122/406.1 |
| 4,028,884 | A * | 6/1977 | Martz | F01K 23/108 60/39.182 |
| 4,665,706 | A * | 5/1987 | Russell | F22B 35/105 60/646 |
| 4,858,562 | A | 8/1989 | Arakawa et al. | |

(Continued)

OTHER PUBLICATIONS

U.S. Appl. No. 15/759,993, filed Feb. 5, 2013, Diego Fernando Rancruel.

*Primary Examiner* — Alissa Tompkins
*Assistant Examiner* — Nathaniel Herzfeld
(74) *Attorney, Agent, or Firm* — Fletcher Yoder, P.C.

(57) ABSTRACT

A system includes a heat recovery steam generator (HRSG) having a plurality of evaporator sections. At least one evaporator section includes a forced circulation evaporator configured to generate a saturated steam, a once-through evaporator configured to generate a first superheated steam, and a first superheater configured to receive the saturated steam and the first superheated steam.

32 Claims, 3 Drawing Sheets

(56) References Cited

U.S. PATENT DOCUMENTS

| | | | |
|---|---|---|---|
| 5,209,188 A * | 5/1993 | Weitzel | F22B 31/0076 |
| | | | 122/451 S |
| 5,564,269 A * | 10/1996 | Briesch | F01K 21/042 |
| | | | 60/39.182 |
| 5,628,179 A | 5/1997 | Tomlinson | |
| 5,660,799 A | 8/1997 | Motai et al. | |
| 5,762,031 A * | 6/1998 | Gurevich | F22B 29/04 |
| | | | 122/1 C |
| 5,775,266 A | 7/1998 | Ziegler | |
| 5,924,389 A | 7/1999 | Palkes et al. | |
| RE36,524 E | 1/2000 | Tomlinson | |
| 6,092,490 A * | 7/2000 | Bairley et al. | 122/7 R |
| 6,189,491 B1 * | 2/2001 | Wittchow et al. | 122/1 C |
| 6,363,711 B2 | 4/2002 | Schmid et al. | |
| 6,557,500 B1 * | 5/2003 | Schroeder | 122/7 R |
| 6,604,354 B2 | 8/2003 | Oto et al. | |
| 6,829,898 B2 * | 12/2004 | Sugishita | F01K 23/106 |
| | | | 122/7 B |
| 7,243,618 B2 * | 7/2007 | Gurevich | F22B 1/1815 |
| | | | 122/406.1 |
| 7,270,086 B2 | 9/2007 | Franke et al. | |
| 7,281,499 B2 | 10/2007 | Franke et al. | |
| 7,445,652 B2 | 11/2008 | Bax | |
| 8,220,274 B2 | 7/2012 | Bono et al. | |
| 2001/0022077 A1 | 9/2001 | Hannemann et al. | |
| 2006/0168962 A1 * | 8/2006 | Armitage | F01K 7/165 |
| | | | 60/645 |
| 2011/0247335 A1 | 10/2011 | Schmid et al. | |
| 2011/0266726 A1 * | 11/2011 | DePuy | C21B 5/00 |
| | | | 266/140 |
| 2012/0180739 A1 | 7/2012 | Rop et al. | |
| 2013/0098313 A1 | 4/2013 | Pang | |
| 2014/0216365 A1 * | 8/2014 | Rancruel et al. | 122/7 R |

\* cited by examiner

SYSTEM AND METHOD FOR HEAT RECOVERY STEAM GENERATORS

BACKGROUND OF THE INVENTION

The subject matter disclosed herein relates to operating heat exchangers, and more particularly, to systems and methods for operating heat recovery steam generators.

Heat exchangers are used to transfer heat from one medium to another in a variety of industries. A heat recovery steam generator (HRSG) is an example of a heat exchanger, which may be used in combined cycle power plants and similar plants. An HRSG may use gas turbine engine exhaust to heat a fluid flowing through heat exchangers in the HRSG, for example, to convert water into steam. In some configurations, the fluid may be steam used for high-pressure, intermediate-pressure, and/or low-pressure sections of a steam turbine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a heat recovery steam generator (HRSG) having a plurality of evaporator sections. At least one evaporator section includes a forced circulation evaporator configured to generate a saturated steam, a once-through evaporator configured to generate a first superheated steam, and a first superheater configured to receive the saturated steam and the first superheated steam.

In a second embodiment, a method includes generating a saturated steam using a forced circulation evaporator in an evaporator section of a heat recovery steam generator (HRSG), generating a first superheated steam using a once-through evaporator in the evaporator section of the HRSG, generating a second superheated steam by superheating the saturated steam from the forced circulation evaporator and the first superheated steam from the once-through evaporator.

In a third embodiment, a system includes an HRSG having a plurality of evaporator sections. At least one of the plurality of evaporator sections includes a forced circulation evaporator configured to generate a saturated steam, a once-through evaporator configured to generate a first superheated steam, a first superheater configured to receive the saturated steam from the forced circulation evaporator, and a second superheater configured to receive the first superheated steam from the once-through evaporator.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
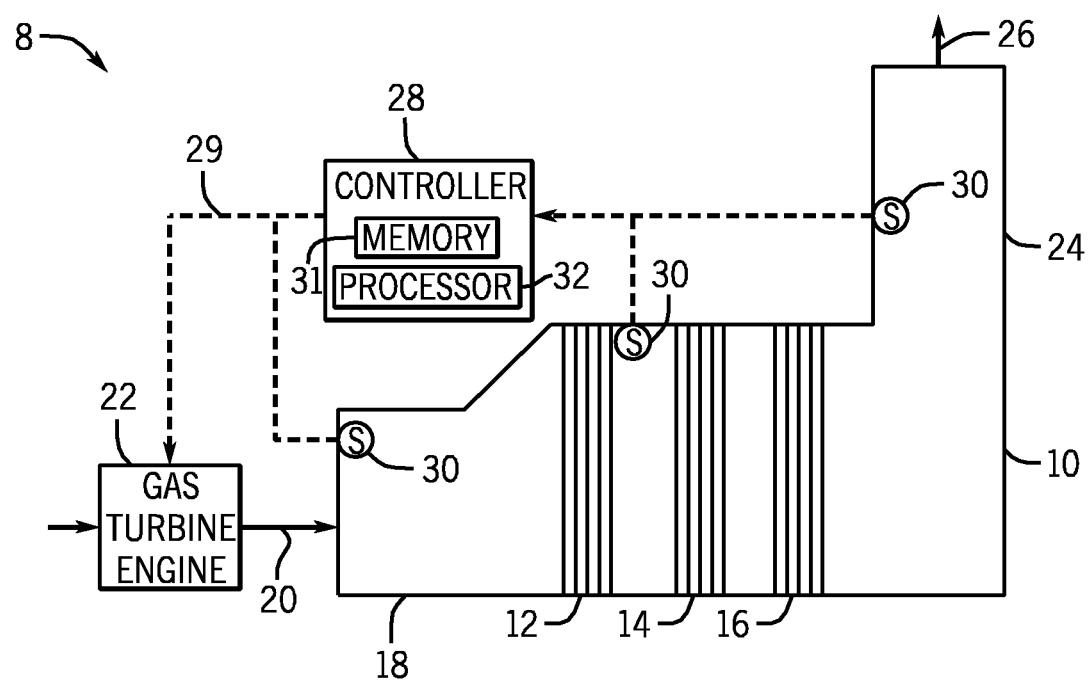
FIG. 1 is a schematic diagram of an embodiment of an HRSG.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for operating an HRSG. For example, a system may include an HRSG including a forced circulation evaporator, a once-through evaporator, and a superheater configured to superheat the steam produced by the evaporators. In a forced circulation evaporator, circulating water from a steam separating drum is partially evaporated after being pumped through heated evaporator tubes. The generated steam is separated in the steam separating drum, and then the remaining water is recirculated to the same heated tubes for further evaporation. Unlike an evaporator relying on natural circulation, a forced circulation evaporator allows for horizontal evaporator piping. This utilizes the temperature profile of the gas turbine exhaust gas that creates steam to send to the steam separating drum. The forced circulation evaporator may also regulate the temperature and the level of the steam separating drum, and may control the stresses during start-up and shut-down. In a once-through evaporator, the transition from liquid to superheated steam takes place in one pass. As such, a once-through evaporator does not use the steam separating drum and water recirculation of a forced-circulation evaporator, which allows it to have potentially faster responses to cycles in the gas turbine engine.

Furthermore, the forced circulation evaporator may use a smaller steam separating drum with a reduced wall thickness as compared to a natural circulation evaporator. Natural circulation evaporators may require longer periods of time to start up in order to maintain stress levels in the steam separating drum. In addition, the forced circulation evaporator may allow a reduction in piping and drum size. Natural circulation evaporators may use vertical heating tubes so that as the feed water boils, bubbles will rise and cause circulation, facilitating the separation of the liquid and vapor at the top of the heating tubes. Because a forced circulation evaporator utilizes a pump, it may include horizontal piping rather than vertical piping. The horizontal piping of the forced circulation evaporator may reduce the height of the HRSG, reducing the size of packaging, reducing transportation and installation costs, and accommodating a larger variety of equipment set-ups.

FIG. 1 is a block diagram of an embodiment of a system 8 that includes an HRSG 10 with one or more HRSG sections (e.g. evaporator sections), each including a forced circulation evaporator and a once-through evaporator. As shown in FIG. 1, the HRSG 10 includes a high-pressure evaporator section 12, an intermediate-pressure evaporator section 14, and a low-pressure evaporator section 16. The high-pressure evaporator section 12 generates high-pressure steam, the intermediate-pressure evaporator section 14 generates intermediate-pressure steam, and the low-pressure evaporator section 16 generates low-pressure steam. Each section, 12, 14, and 16, is a heat exchanger that generates steam by transferring heat from the heated exhaust gas 20 to water or steam. As discussed in detail below, each of the sections, 12, 14, and 16, may include a forced circulation evaporator, a once-through evaporator, and a first superheater. The combination of the forced circulation evaporator and the once-through evaporator may allow for an evaporator section with more operating flexibility that can meet the demands of a fast response combined cycle power plant while providing high quality steam. The high-pressure section 12 is located near an inlet section 18 of the HRSG 10. As the temperature of heated exhaust gas 20 from a gas turbine engine 22 may be highest near the high-pressure section 12, the high-pressure section generates high-pressure steam. In other words, the high temperature of the heated exhaust gas 20 near the high-pressure section 12 provides sufficient heat to produce the high-pressure steam. The heated exhaust gas 20 from the gas turbine engine 22 enters the HRSG 10 in the inlet section 18. After the heated exhaust gas passes through the high-pressure section 12, the intermediate-pressure section 14, and the low-pressure section 16, a cooled exhaust gas 26 exits HRSG 10 from an HRSG stack 24. Thus, the cooled exhaust gas 26 may exit from the HRSG stack 24 into the atmosphere. In other embodiments, the intermediate-pressure section 14 may be omitted or the HRSG 10 may be configured as a single-pressure system.

In certain embodiments, the system 8 may include a controller 28 having memory 31 and a processor 32, which may be used to control certain aspects of the system 8. For example, the controller 28 may send or receive signals 29 (e.g., feedback data) from one or more sensors 30 disposed in the HRSG 10. In certain embodiments, the sensors 30 may be disposed in the inlet section 18, adjacent to one or more of the high-pressure section 12, intermediate-pressure section 14, or low-pressure section 16, or in the HRSG stack 24. The sensors 30 may measure various conditions or parameters of the HRSG 10, such as, but not limited to, a level of an unburnt fuel, a level of oxygen, a level of emissions (e.g., carbon monoxide, nitrogen oxides, sulfur oxides, or any combination thereof), a temperature, a flow rate, a pressure, or any combination thereof. More specifically, the controller 28 may use the information received from the sensors 30 to generate and send signals 29 (e.g., control signals) to one or more components of the system 8. For example, the controller 28 may send or receive signals 29 (e.g., feedback and/or control signals) from the forced circulation evaporator 58, the once-through evaporator 60, or the first superheater 62. Furthermore, the controller 28 may send or receive signals 29 from the gas turbine engine 22, or another part of the system 8.

Figure 2:
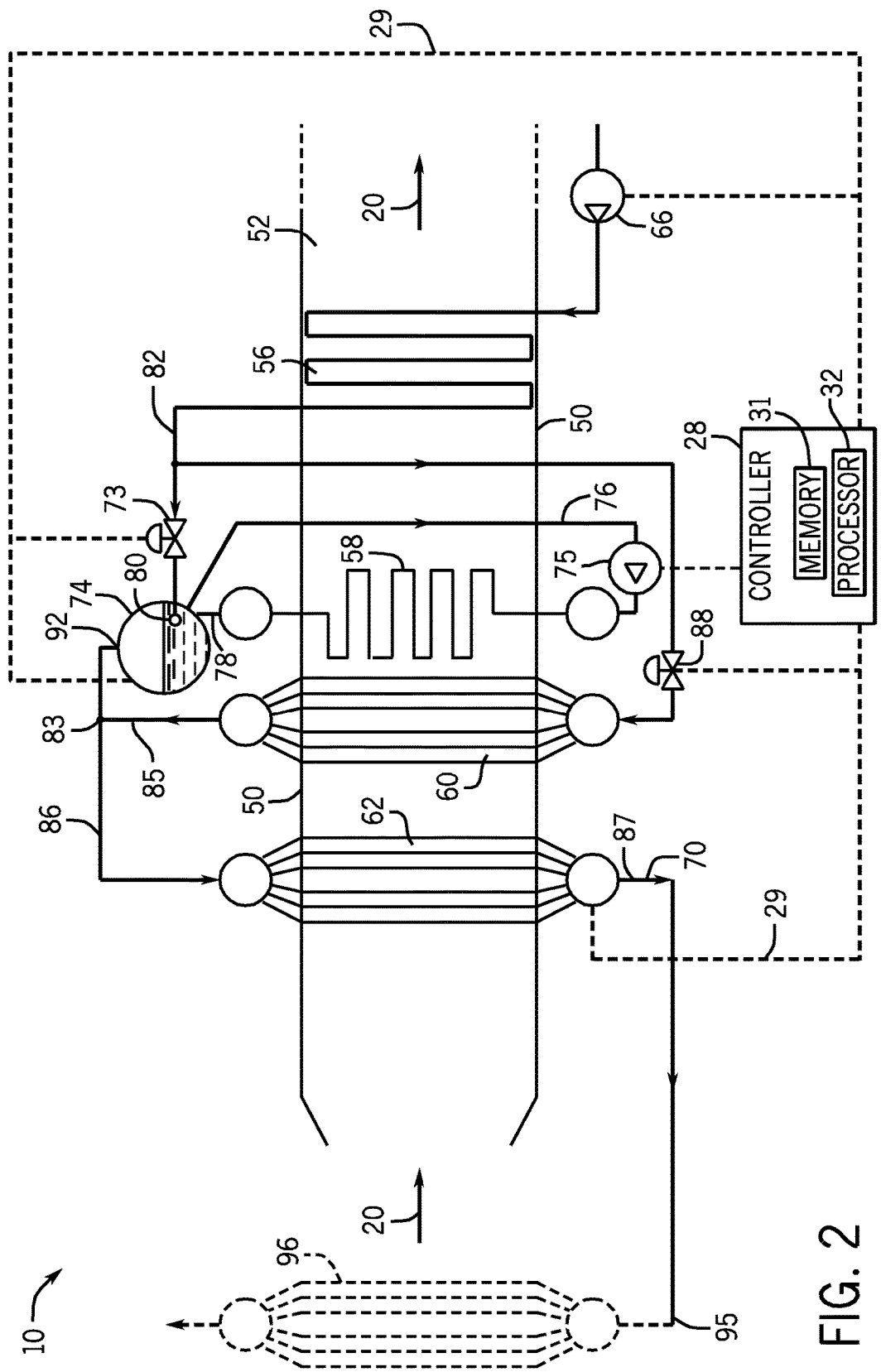
FIG. 2 is a schematic diagram of an embodiment of a portion of an HRSG having a forced circulation evaporator, a once-through evaporator, and a superheater.

FIG. 2 is a schematic diagram of a portion of an embodiment of the HRSG 10. For example, FIG. 2 may represent at least one of the evaporator sections 12, 14, or 16. In certain embodiments, the HRSG 10 includes at least one evaporator that relies on forced circulation and another evaporator that is a once-through section. As shown in FIG. 2, the HRSG 10 includes an economizer 56, a forced circulation evaporator 58, a once-through evaporator 60, and a first superheater 62. The HRSG 10 has enclosing walls 50, which form a heating gas duct 52 through which the heating gas from the gas turbine engine 22 flows in the direction indicated by arrows 20. Additionally, the HRSG 10 includes a steam separating drum 74, a feed water pump 66, and the controller 28.

Feed water passes through the feed water pump 66 to provide a controlled water supply to the economizer 56. The feed water may flow from a condenser, where steam flowing from the steam turbine at low pressure and low temperature is condensed. The feed water may be stored, preheated, and conditioned in a feed water tank before being sent to the economizer 56 by the feed water pump 66. In certain embodiments, the feed water pump 66 may be a variable frequency pump, which may provide feed water at different flow rates by adjusting the speed of the motor coupled to the pump 66. The economizer 56 may preheat the feed water with the enthalpy of fluid streams that are not hot enough to be used in an evaporator. The economizer recovers useful heat from the system 8, thereby increasing its efficiency. In certain embodiments, two economizers 56 may be used, with each one feeding a separate evaporator (e.g., 58 or 60). This may allow the feed water for the once-through evaporator 60 and the forced circulation evaporator 58 to be generated from different sources. For example, the once-through evaporator 60 could use feed water from an independent water polisher. After exiting the economizer 56, a feed water line 82 splits, allowing water to flow through a first control valve 73 or a second control valve 88. Feed water flowing through the first control valve 73 passes through a drum water inlet 80 and into the steam separating drum 74. The first control valve 73 maintains the water level of the steam separating drum 74 under all loads. In other words, if the level of the steam separating drum 74 falls below a threshold, the first control valve 73 may open further to allow additional feed water into the steam separating drum 74. Similarly, if the level of the steam separating drum 74 rises above a threshold, the first control valve 73 may close further to allow less feed water into the steam separating drum 74. More specifically, the heated water from the steam drum 74 is transported through downcomers 78 into the heated tubes of the forced circulation evaporator 58, where the water heats to a saturation temperature, evaporates, and is returned to the drum 74 through risers 76 as a steam water mixture. A saturated steam 83 is separated from hot water in the drum 74, and exits through the drum steam outlet 92. The saturated steam 83 enters the first superheater 62 through the first inlet steam line 86.

Alternatively, water from the feed water pump 66 may flow from the economizer 56 to the second control valve 88, and into the once-through evaporator 60, located upstream of the forced circulation evaporator 58 The once-through evaporator 60 creates a first superheated steam 85, which is combined with the saturated steam 83 before being further superheated. In the once-through evaporator 60, the feed water is evaporated and the steam is superheated in the heated evaporator 60 tubes without fluid recirculation or the use of a separating drum, such as steam separation drum 74. Thus, in contrast to the forced circulation evaporator 58, the once-through evaporator 60 does not utilize downcomers or a drum. Because the once-through evaporator does not utilize a steam separating drum, which involves preheating, the once-through evaporator 60 may have a faster start-up time than the forced circulation evaporator 58.

As a result of being disposed upstream of the forced circulation evaporator 58 with respect to the heated exhaust gas 20 flowing through the duct 52, the once-through evaporator 60 is exposed to higher temperature heated exhaust gas 20 than the forced circulation evaporator 58. The forced circulation evaporator 58 is exposed to lower temperature heated exhaust gas 20 than the once-through evaporator 60, so it has less heat transfer in the heating surfaces of the evaporator. For this reason, the forced circulation evaporator 58 may produce less steam than the once-through evaporator 60. The hotter exhaust gas 20 contributes to the production of a superheated steam by the once-through evaporator 60, compared to the saturated steam 83 produced by the forced circulation evaporator 58. Additionally, the forced circulation evaporator 58 may be configured to have a reduced steam output compared to the once-through evaporator 60. For example, the forced circulation evaporator 58 may be configured to produce approximately 20 to 40% of the steam in the HRSG section 12, 14, or 16, while the once-through evaporator 60 may be configured to produce approximately 60-80% of the steam. The smaller steam production burden may allow the forced circulation evaporator 58 to be smaller in size than it would be if it were configured to produce a larger proportion of the steam.

The interactions between the first control valve 73, the feed water pump 66, and the evaporator pump 75 determine the flow of water to the once-through evaporator 60 of the HRSG 10. For example, if the level of the steam separating drum 74 falls below a threshold, the speed of the variable frequency feed water pump 66 and/or the evaporator pump 75 may be increased in order to raise the level. Alternately, if the level of the steam separating drum 74 rises above a threshold, the speed of the variable frequency feed water pump 66 and/or the evaporator pump 75 may be decreased.

The forced circulation evaporator 58 produces saturated steam 83, and the once-through evaporator 60 generates a first superheated steam 85. The saturated steam 83 produced by the forced circulation evaporator 58 and the first superheated steam 85 from the once-through evaporator section 60 flow through a first inlet steam line 86 to the first superheater 62. The superheater 62 superheats the saturated steam 83 and the first superheated steam 85 to produce a second superheated steam 87. The second superheated steam 87 exits the superheater 62 via an outlet line 70. The HRSG 10 may include an optional final superheater 96, which may further superheat the second superheated steam 87 before it is used downstream in the steam turbine system.

In certain embodiments, the HRSG 10 may include the controller 28 having the memory 31 and processor 32, which may be used to control certain aspects of the HRSG 10. The controller 28 may send or receive signals 29 from one or more sensors 30, shown in FIG. 1, disposed in the HRSG 10. For example, sensors 30 may be disposed at the outlet of the first superheater 62, at valve 88, at feed water pump 66, at valve 73, and in the steam separating drum 74. The sensors 30 may sense a level of an unburnt fuel, a level of oxygen, a level of emissions (e.g., carbon monoxide, nitrogen oxides, sulfur oxides, or any combination thereof), a temperature, a flow rate, a pressure, a water level, humidity, or any combination thereof. The controller 28 may use the information received from the sensors 30 to generate and send signals 29 (e.g., control signals) to one or more components of the HRSG 10. Specifically, the controller 28 may send signals 29 (e.g., control signals) to the feed water pump 66, the evaporator pump 75, the first control valve 73, or the second control valve 88. Additionally, the control valves 73 and 88 can be managed by the controller 28, which distributes the water flow between the evaporator sections 58 and 60 depending on the water level in the steam drum 74 and the steam temperature in the first inlet steam line 86, or at some other point downstream of the evaporators 58 and 60. For example, if the sensors 30 detect a temperature above a certain threshold value in the first inlet steam line 86, the controller 28 may control the control valve 88 to supply less feed water to the once-through evaporator 60. Because the once-through evaporator 60 produces a hotter steam that the forced circulation evaporator 58, reducing the flow of feed water to that evaporator may lower the temperature of the second superheated steam.

Instructions for the controller 28 may be disposed on a non-transitory, machine readable medium (e.g., the memory 31), which may allow the controller 28 to control the HRSG 10. These instructions may control the HRSG to generate a saturated steam 83 with a forced circulation evaporator, generate a first superheated steam with-a once-through evaporator, and feed the first superheated steam and the second superheated steam into a second superheater (e.g., 96) to generate a third superheated steam. The instructions may also be configured to maintain a temperature of the third superheated steam above a threshold by adjusting at least one of a first flow rate of the first superheated steam, or a second flow rate of the second superheated steam, or a combination thereof. Furthermore, the instructions may be configured to generate a third superheated steam by superheating the second superheated steam, and may be configured to control a level in steam separating drum 74.

Figure 3:
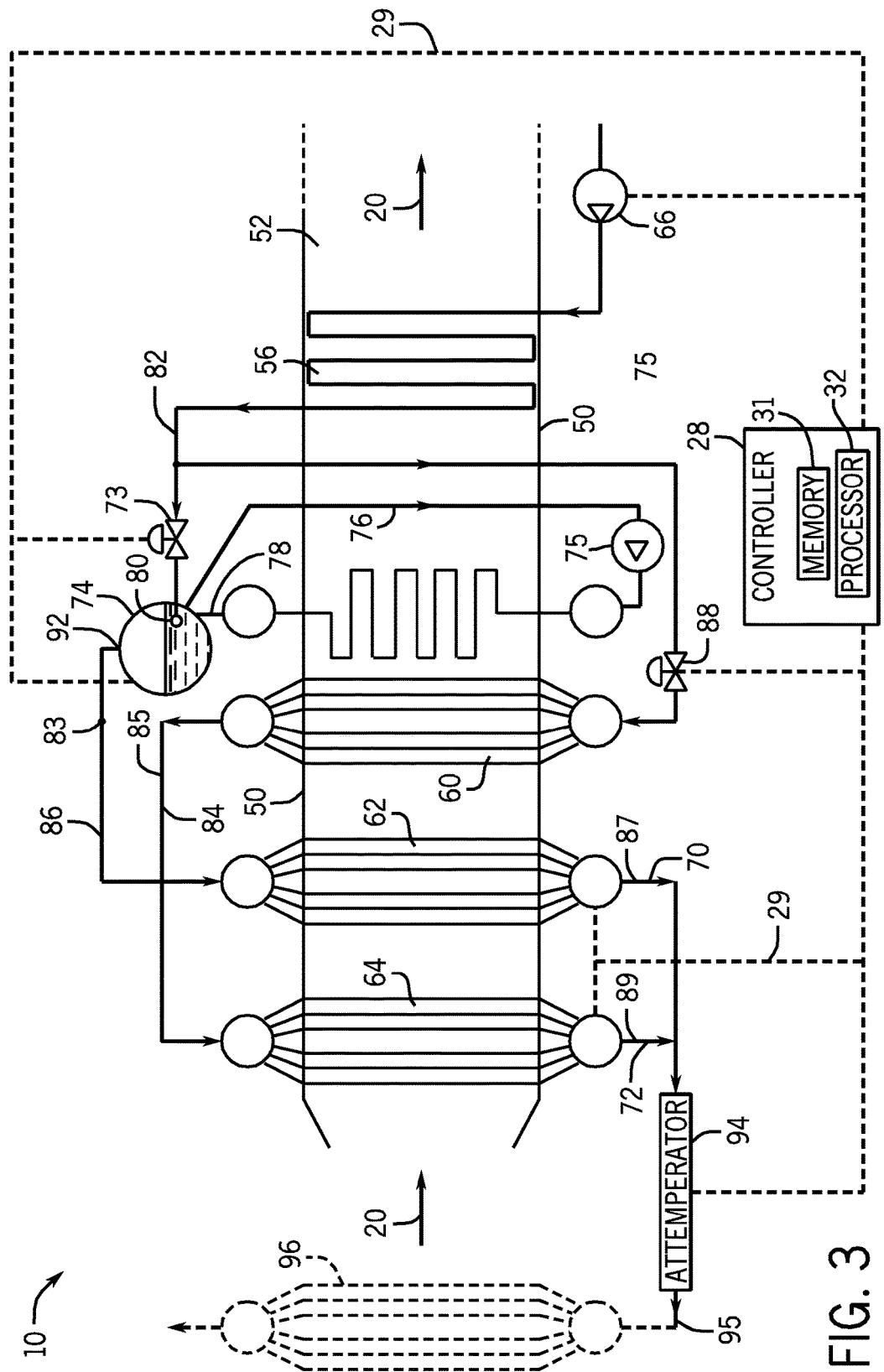
FIG. 3 is a schematic diagram of an embodiment of a portion of an HRSG having a forced circulation evaporator, a once-through evaporator, a first superheater, and a second superheater.

FIG. 3 is a schematic of a portion of an embodiment of the HRSG 10. FIG. 3 may represent at least one of the evaporator sections 12, 14, or 16 of the HRSG 10. In certain embodiments, the HRSG 10 includes the economizer 56, the forced circulation evaporator 58, the once-through evaporator 60, the first superheater 62, a second superheater 64, and an attemperator 94. The first superheater 62 may be connected to the forced circulation evaporator 58 and the second superheater 64 may be connected to the once-through evaporator 60. As in FIG. 2, feed water passes through the feed water pump 66 to the economizer 56, where it is preheated. After exiting the economizer 56, the feed water may pass through a first control valve 73 or a second control valve 88. Feed water flowing through the first control valve 73 passes into the steam separating drum 74, which may then be pumped through the forced circulation evaporator by the evaporator pump 75. Feed water from the feed water pump 66 may pass through the second control valve 88, and into the once-through evaporator 60. The forced circulation evaporator 58 produces a saturated steam 83, and the once-through evaporator 60 produces a first superheated steam 85. The saturated steam 83 may flow through the first inlet steam line 86 to the first superheater 62, which generates a second superheated steam 87. The first superheated steam 85 is carried by a second inlet steam line 84 to the second superheater 64, which produces a third superheated steam 89. The second independent superheater 64 produces a third superheated steam 89. The second superheated steam 87 exits the first superheater 62 via a first outlet line 70. The third superheated steam 89 exits the second independent superheater 64 via a second outlet line 72. The first and second outlet lines 70 and 72 enter the attemperator 94, which generates a fourth superheated steam 95.

The attemperator 94 allows for more robust control of the heated exhaust temperature of the fourth superheated steam 95 by the independent superheaters 62 and 64. Specifically, the attemperator 94 may be configured to control the temperature of the fourth superheated steam 95 by using the steam 83 from the forced circulation evaporator 58 to attemperate the steam 85 from the once-through evaporator 60 to produce the fourth superheated steam 95. Because the forced circulation evaporator 58 is located downstream of the heated exhaust flow 20 in the boiler duct 54 with respect to the once-through evaporator 60, the forced circulation evaporator 58 has a lower temperature when exposed to a lower temperature heated exhaust gas 20, and produces lower temperature steam than the once-through evaporator 60. In contrast, the once-through evaporator 60 generates superheated steam. Because of this temperature difference, the two steams may be used to temper each other to reach a pre-determined temperature or temperature range using the attemperator 94. Once attemperated, the fourth superheated steam 95 may be used elsewhere in the system 8, or may be further superheated by an optional final superheater 96, which may superheat the fourth superheated steam 95 before it is used downstream in the steam turbine system, for example by a steam turbine.

The system 8 or HRSG 10 may form a part of an integrated gasification combined cycle (IGCC) power plant. An IGCC power plant converts a fuel source into syngas through the use of a gasifier. A gasifier may combine a fuel source (e.g., a coal slurry) with steam and oxygen to produce the syngas. The product syngas may be provided to a combustor to combust the syngas with oxygen to drive one or more gas turbine engines. Heat from the IGCC power plant (e.g., gas turbine engines) may be used to generate steam to drive one or more steam turbines. For example, the hot exhaust gases from the gas turbine engine may be used to generate steam in the HRSG 10 that is then used to drive a steam turbine, which may be connected to a load to generate electricity.

As discussed above, embodiments of the HRSG 10 allow for a flexible evaporator section (e.g., 12, 14, or 16) that can meet the demands of fast response combined cycle power plants. Specifically, the evaporator section may include the economizer 56, the forced circulation evaporator 58, the once-through evaporator 60, and the first superheater 62. Additionally, the HRSG 10 may include a steam separating drum 74, a feed water pump 66, and an evaporator pump 75. A forced circulation evaporator allows for horizontal evaporator piping, which utilizes the temperature profile of the gas turbine exhaust gas that creates steam to send to the separating drum. The forced circulation evaporator 58 may also regulate the temperature and the level of the steam separating drum, and may control the stresses during start-up and shut-down. Faster start-up times may provide more operational flexibility than HRSG's that use only forced circulation type evaporators, which require longer start-up times in order to pre-heat the steam separating drum. Furthermore, the hybrid HRSG 10 with a forced circulation evaporator and a once-through evaporator may reduce the size and wall thickness of the steam separating drum 74, as compared to an HRSG 10 that uses only forced circulation evaporators, since part of the steam is produced by a once-through evaporator 60, which does not use a steam separating drum 74. By using a once-through evaporator 60 and a forced circulation evaporator 58, the overall size of the HRSG 10 may be reduced, since the size of the steam separating drum 74 may be reduced. Furthermore, having the superheater 62 and the second superheater 64 may reduce energy loss from mixing steams of different conditions, allowing better recovery of available heat and thereby increasing operational capability. This technology may be applied to the high-pressure section 12, intermediate-pressure section 14, or low-pressure section 16, or any combination thereof, of the steam turbine engine of the system 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a heat recovery steam generator (HRSG), comprising:
a plurality of different pressure evaporator sections, wherein at least one of the plurality of different pressure evaporator sections is a low-, intermediate-, or high-pressure evaporator section that comprises:
a first evaporator configured to generate a saturated steam;
a second evaporator configured to generate a first superheated steam;
a first superheater configured to receive the saturated steam from the first evaporator and generate a second superheated steam; a second superheater configured to receive the first superheated steam from the second evaporator and generate a third superheated steam; and a downstream system configured to receive the second superheated steam from the first superheater and the third superheated steam from the second superheater, wherein the downstream system comprises an attemperator configured to receive the second superheated steam from the first superheater and the third superheated steam from the second superheater.

2. The system of claim 1, wherein the HRSG comprises the high-pressure evaporator section, the intermediate-pressure evaporator section, and the low-pressure evaporator section.

3. The system of claim 1, wherein the second evaporator comprises a once-through evaporator disposed upstream of the first evaporator comprising a forced circulation evaporator.

4. The system of claim 1, wherein the second superheater is disposed upstream of the first superheater.

5. The system of claim 1, wherein each of the first and second superheaters is disposed upstream of both the first evaporator and the second evaporator.

6. The system of claim 1, comprising a first control valve configured to adjust a flowrate of water entering the first evaporator, and a second control valve configured to adjust a flowrate of water entering the second evaporator.

7. The system of claim 1, comprising a controller configured to independently control a first flow through the first evaporator and the first superheater and a second flow through the second evaporator and the second superheater.

8. The system of claim 1, comprising an integrated gasification combined cycle (IGCC) power plant having the HRSG.

9. The system of claim 1, wherein the second evaporator comprises a once-through evaporator disposed upstream of the first evaporator comprising a forced circulation evaporator, the second superheater is disposed upstream of the first superheater, and each of the first and second superheaters is disposed upstream of both the first evaporator and the second evaporator.

10. The system of claim 1, comprising a third superheater configured to receive a flow from the attemperator.

11. The system of claim 1, wherein the first evaporator comprises a forced circulation evaporator configured to generate approximately 20 to 40 percent of the steam produced in at least one of the plurality of evaporator sections, and the second evaporator comprises a once-through evaporator configured to generate approximately 60 to 80 percent of the steam produced in the at least one of the plurality of evaporator sections.

12. The system of claim 1, wherein the first evaporator comprises a forced circulation evaporator having horizontal piping.

13. The system of claim 1, wherein the first evaporator comprises a forced circulation evaporator.

14. The system of claim 1, wherein the second evaporator comprises a once-through evaporator.

15. A method of operation of a heat recovery steam generator (HRSG), comprising:
generating a saturated steam using a first evaporator disposed in an evaporator section of the heat recovery steam generator (HRSG)
generating a first superheated steam using a second evaporator disposed in the evaporator section of the HRSG;
generating, via a first superheater, a second superheated steam by superheating the saturated steam from the first evaporator;
generating, via a second superheater, a third superheated steam by superheating the first superheated steam from the second evaporator; and routing the second superheated steam from the first superheater and the third superheated steam from the second superheater to a downstream system, wherein routing comprises attemperating the third superheated steam with the second superheated steam in an attemperator of the downstream system to generate a fourth superheated steam.

16. The method of claim 15, comprising independently controlling, via a controller, a first flow through the first evaporator and the first superheater and a second flow through the second evaporator and the second superheater.

17. The method of claim 15, wherein the second evaporator comprises a once-through evaporator located upstream of the first evaporator comprising a forced circulation evaporator.

18. The method of claim 15, wherein the second superheater is disposed upstream of the first superheater.

19. The method of claim 15, comprising receiving a heated flow through first regions having the first and second superheaters upstream of second regions having the first evaporator and the second evaporator.

20. The method of claim 15, comprising superheating, via a third superheater, the fourth superheated steam from the attemperator.

21. The method of claim 15, wherein the evaporation section is a low-, intermediate-, or high-pressure evaporator section that comprises the first evaporator, the second evaporator, the first superheater, and the second superheater.

22. The method of claim 15, wherein the saturated steam is approximately 20 to 40 percent of a total steam in the evaporator section, and the first superheated steam is approximately 60 to 80 percent of the total steam in the evaporator section.

23. The system of claim 15, wherein the first evaporator comprises a forced circulation evaporator and the second evaporator comprises a once-through evaporator.

24. A system, comprising:
a heat recovery steam generator (HRSG) comprising:
a plurality of evaporator sections, wherein at least one of the plurality of evaporator sections comprises:
a first flow path having a forced circulation evaporator configured to generate a saturated steam and a first superheater configured to receive the saturated steam from the forced circulation evaporator and generate a second superheated steam;
a second flow path having a once-through evaporator configured to generate a first superheated steam and a second superheater configured to receive the first superheated steam from the once-through evaporator and generate a third superheated steam, wherein the first and second flow paths are in a parallel configuration;
an attemperator configured to receive flows from the first and second flow paths, wherein the attemperator is configured to attemperate the third superheated steam with the second superheated steam to generate a fourth superheated steam.

25. The system of claim 24, wherein the once-through evaporator is disposed upstream of the forced circulation evaporator.

26. The system of claim 24, wherein the second superheater is disposed upstream of the first superheater.

27. The system of claim 24, comprising a controller having instructions disposed on a non-transitory, machine readable medium, wherein the instructions are configured to independently control a first flow through the first flow path to the attemperator and a second flow through the second flow path to the attemperator.

28. The system of claim 24, comprising an integrated gasification combined cycle (IGCC) power plant having the HRSG.

29. A system, comprising:
a plurality of evaporator sections, wherein at least one evaporator section of the plurality of evaporator sections comprises:
a first evaporator configured to generate a saturated steam;
a second evaporator configured to generate a first superheated steam;
a first superheater configured to receive the saturated steam from the first evaporator and generate a second superheated steam;
a second superheater configured to receive the first superheated steam from the second evaporator and generate a third superheated steam; and
an attemperator configured to receive the second superheated steam from the first superheater and the third superheated steam from the second superheater.

30. The system of claim 29, comprising a heat recovery steam generator (HRSG) having the evaporator section.

31. The system of claim 29, wherein the first evaporator comprises a forced circulation evaporator.

32. The system of claim 29, wherein the second evaporator comprises a once-through evaporator.

* * * * *